Figure 1:
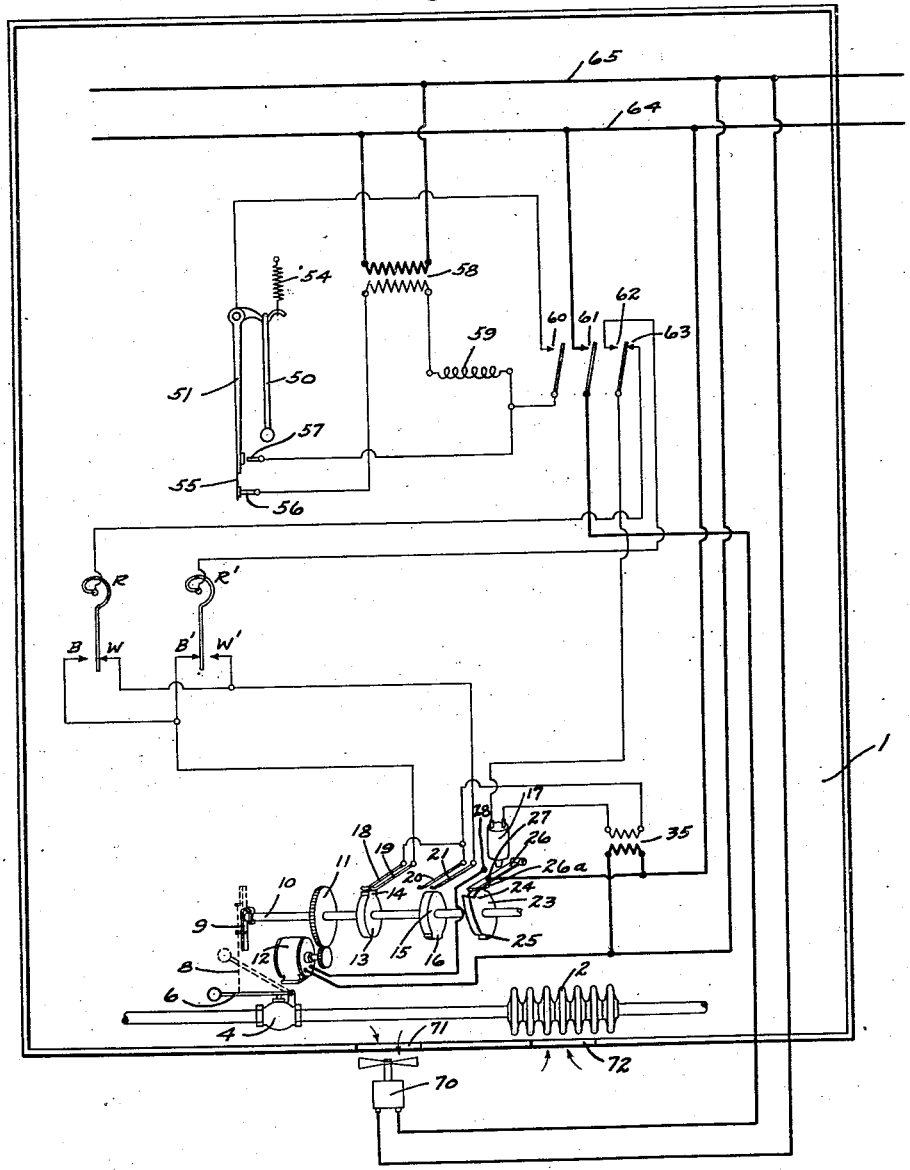

Dec. 5, 1933.  G. D. KINGSLAND  1,937,968
HUMIDITY CONTROL SYSTEM
Filed Sept. 2, 1930  2 Sheets-Sheet 1

INVENTOR
GEORGE D. KINGSLAND
BY
ATTORNEYS

Dec. 5, 1933.  G. D. KINGSLAND  1,937,968
HUMIDITY CONTROL SYSTEM
Filed Sept. 2, 1930   2 Sheets-Sheet 2

INVENTOR
GEORGE D. KINGSLAND
BY
ATTORNEYS

Patented Dec. 5, 1933

1,937,968

UNITED STATES PATENT OFFICE 1,937,968

HUMIDITY CONTROL SYSTEM

George Dudley Kingsland, Minneapolis, Minn., assignor to Minneapolis-Honeywell Regulator Company, Minneapolis, Minn., a corporation of Delaware Application September 2, 1930. Serial No. 479,384

12 Claims. (Cl. 236—1)

This invention relates to an automatically operable control system, adapted to selectively regulate temperature and humidity in any enclosure, such as a room, a greenhouse, etc.

It is well known that humidity can be controlled by temperature regulation. The proper control of relative humidity, however, is concerned with variable factors or sets of conditions which can only be properly met or controlled, automatically. The present device provides such an automatic control.

An important object of this invention is to provide for the automatic air replacement, in an enclosure, by means of heat, or by exhaustion, or by both, and thus prevent the relative humidity rising above a prescribed maximum.

The device has found practical application to greenhouse humidity and temperature regulation, where tomatoes have been raised. Many losses have been experienced, in raising tomatoes in greenhouses, the greatest loss resulting from production of tomato leaf mould. It is known that excessive atmospheric moisture, which stimulates epidemics of leaf mould, has heretofore been difficult to avoid, partly due to lack of adequate ventilation, partly due to neglect by the worker to properly regulate the air, and partly due to lack of understanding by the workers as to what constitutes an undesirable air condition, in relation to disease.

Stagnant air, which is present in bright warm weather, is one of two important causes contributing to epidemics of plant disease in greenhouses. Stagnant air condition can be avoided by providing adequate ventilation. The second contributing cause is excessive atmospheric humidity which occurs either at night or on sunless or rainy days, and is the equivalent of morning dew. It can be regulated by proper control of heat. It is well known that temperature has a direct bearing upon relative humidity or dampness of air. This present device provides for the proper automatic regulation of temperature to prevent the production of relative humidity above that predetermined minimum which will favor development of disease in the plants.

In one embodiment, the control of the humidity is accomplished by a plurality of temperature control devices which are set to act between fixed maximum and minimum temperatures, these devices being controlled by a hygrostat which, according to the degree of humidity, shifts the control of the system from one thermostatic control element set to act at 60° F. (the minimum growing temperature for greenhouse tomatoes, for example) to another thermostat set at 70° F. This shifting control may be adapted to vary the supply of heat furnished by the steam or hot water system, within the limits of 2° F. It will be evident that the temperature levels at which the thermostats perform their functions may be varied as desired.

It will be further understood that the present device may be adapted, and is illustrated as so adapted, to automatically control the draft, or ventilation. There may be a number of control valves in the heating line, and the arrangement may be such that the last one satisfied and closed will condition the heating source to reduce the heating effect. Such an arrangement results in maximum fuel economy.

Figure 2:
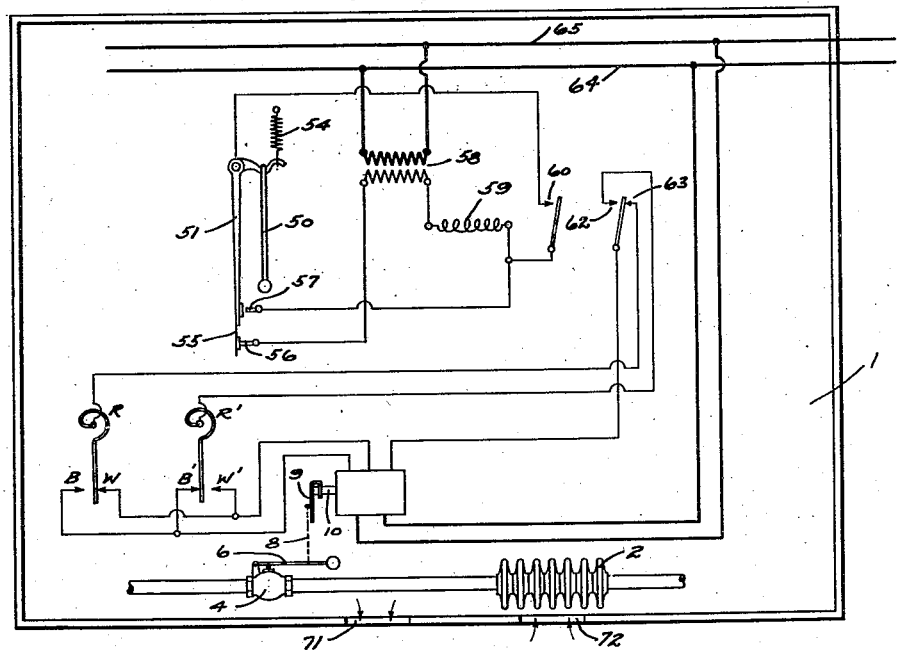
Figure 3:
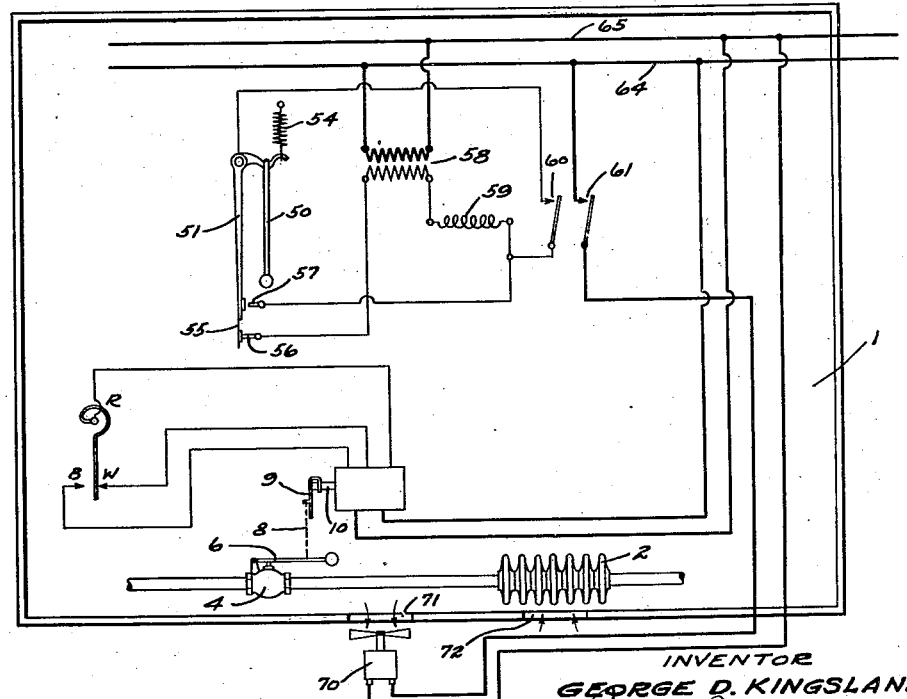

Features, objects, and advantages of the invention will be set forth in the description of the drawings forming a part of this application, and in said drawings Figure 1 is a diagrammatic view showing an embodiment of the invention in which an hygrostat, and two thermostatically-operable devices are used to control the de-humidifying means;

Figure 2 diagrammatically illustrates a form of the invention analogous to that shown in Figure 1, with the exception that no ventilating fan is included in the de-humidifying means; and Figure 3 diagrammatically illustrates a system in which a hygrostat and a single thermostat only are used to control the de-humidifying means.

For the sake of brevity, the main parts of the device and their functions only will be preliminarily descriptively and numerically referred to. More detailed numerical references are made under the heading "Operation". The main parts, as illustrated in Figure 1, are: a controlling hygrostat as a humidity-operable switch, including contacts 56—57, arms 51—55, moisture-affectable element or elements 50 adapted to move the arms 51—55 in the manner of a switch away from the contacts, and means 54 to move the arms toward the contacts; high and low temperature thermostats, respectively having thermally-affectable element R alternately engageable with contacts B—W, and elements R' engageable with contacts B'—W'; a relay having a coil 59 suitably electrically connected to be controlled by the hygrostat, and in turn controlling holding contact 60, ventilator control contact 61 and command-transfer contacts 62—63, adapted to alternately shift heating apparatus control from one thermostatic device to the other. The devices R—B—W, and R'—B'—W' properly control the heating system control means of any preferred form. The form herein is diagrammatically illustrated, is a practical device, and includes: a motor 12, suitably connected with power lines 64—65. This motor is adapted, through suitable gearing 11, to rotate shaft 10. Shaft 10 is provided with a crank 9 connected by element 8 with the arm 6 of valve 4, which valve controls the heat supply line to radiator 2 or other equivalent device. On shaft 10 is a switch control element 13 having a cam projection 14 which is adapted to engage and electrically connect contacts 18 and 19, when the device is positioned as shown in the diagram. The shaft 10 also has another switch control element 15 having a projection 16 diametrically related to the projection 14, which projection 16 is adapted to electrically connect contacts 20—21. By this arrangement, a half rotation of the shaft from the position shown will open contacts 18—19 and close contacts 20—21. The shaft also has a cam element 23 having diametrically related peripheral shoulders 24—25 facing in opposite directions. A pivoted armature 26 is supported at one end by the cam, and by means of projection 26ᵃ is adapted to be raised and lowered by the cam 23. As positioned in the drawings, the element 26ᵃ lies substantially against the shoulder in which position the armature 26 is open and contacts 27—28 open. On energization of the magnet 17, armature 26 is raised to close contacts 27—28, and the cam acts to mechanically hold the switch for periods substantially corresponding respectively to the opened and closed positions of the valve 4. The contacts 27—28 are permitted to open both when the valve is fully closed and when fully opened. The electrical connections between switch 18—19, 20—21, and the thermostats, and the circuit arrangement in general is clearly shown in the drawings, and the relations are more clearly indicated in the description of the operation, in which the various circuits are traced.

The enclosure in which the humidity is to be controlled has been indicated at 1, the ventilating opening through which the air is exhausted, in this instance, by suction is indicated at 71, and the fan is indicated at 70. Its operation is controlled by switch 61. The ventilating opening through which outside air enters is indicated at 72. There may be any number of these openings, and a heater device is arranged in reference to the opening or openings so that the air is heated as it enters.

Operation

With the parts positioned as shown in Figure 1, the heat supply is shut off (valve 4 closed), the hygrostat has not reached its high limit, the low temperature thermostat (R—B—W) is in control, the high thermostat is sufficiently cold to make at B'—R', the fan 70 is inoperative. For purposes of illustration, and the supposition is that R—W of the low thermostat is closed when the hygrostat closes its high limit contact 57, on a call for less humidity. Assume contact 57 to close. Relay 59 is energized through the following circuit: one side of secondary of source 58, contact 56, arm 55, arm 51, contact 57, to one side of relay coil 59, and from the opposite side of the coil to the opposite side of the source 58. On energization of the relay, holding contact 60 is closed so that de-energization of the relay will not take place until both contacts 57 and 56 open (contact 56 is first to close, last to open). By this energization, contact 61 is also closed and the suction fan 70 is energized. Also by this energization, contact 63 is opened and contact 62 closed whereby control of the heating means is transferred from the "low" to the "high" thermostat. Under the conditions here imagined, contact B'—R' is closed. On closure of contact 62, heat is supplied as the result of energization of motor 12 of the valve control mechanism. The circuit is as follows: From the secondary of source 35 to contact 18, to contact 19, to B', R', contact 62, magnet 17, to opposite side of source 35. On energization of magnet 17, armature 26 moves to close contacts 27—28, the motor 12 is energized, and shaft 10 rotated. As herein designed, the shaft is now given a rotation of 180°, bringing the arm 9 to a position diametrically opposite to that shown, raising the valve control lever 6 and opening the valve 4. During this shaft rotation, contacts 18 and 19 are opened and at the end of this rotative period of the shaft, contacts 20 and 21 are made so that the heating system is conditioned to be controlled by the "low" thermostat, on reclosure of contact 63. At the end of this rotative period, the armature 26 drops out and motor 12 is de-energized, leaving the valve open. The system is now operating to remove humid air (fan 70 operating) and heat incoming air, so that shortly the humidity will be reduced from 81% to below 80%, or to any desired humidity level. When this level is reached, contact 56 is opened, and relay 59 is de-energized, holding contact 60 is opened, fan contact 61 is opened, contact 62 is broken, and contact 63 made. This de-energization results in transferring the control from the "high" to the "low" thermostat, which "low" thermostat is at this time closed at R—W. It, therefore, results that the magnet 17 is again energized through the following circuit: one side of source 35, 17, contact 63, R, W, contact 21, contact 20, to the other side of source 35, and armature 26 again moved to close contact 27—28 resulting in energization of the motor and re-rotation of shaft 10 (in the same direction) and movement of valve lever 6 to the position shown in the drawings to close valve 4. At the end of the rotative movement, the parts are again positioned as shown in Figure 1 with the contacts 18—19 making and contacts 20—21 open. Therefore, by closure of contact 63, the heat is turned off and the apparatus is again conditioned for control by the high thermostat with contact B'—R' closed so that on rise of humidity to the critical point, valve 4 will be opened. Thermostat R'—B'—W' serves to anticipate an in-flow of colder air, and to so control the heat that the inside temperature does not drop below the point desired. Ordinarily B'—R' of the high thermostat will be making when a call for less humidity is made, and ordinarily when there is a call for less humidity the low thermostat will be making at R—W, but no limitation is intended by this statement.

Heat and/or forced ventilation are involved in the present system, and the control of heat, and operation of the ventilating means are governed by a single thermostat, or by a plurality of thermostats.

In Figure 1, two thermostats are placed in the enclosure, one which is adapted to turn on the heat at 61° F. which is the minimum growing temperature, for example of some vegetable; and another thermostat which turns on the heat at any temperature below 75° F. when humidity rises above the critical point. It is to be noted that heat control and ventilating control may or may not be employed independently of one another. The fan and heating system may be considered an electrically-operable or controllable means for reducing humidity, and this means may include ventilating openings controlled by adjustable louvers (not shown).

In this embodiment, the low thermostat is in control while the humidity rises. As the relay is closed on a call for less humidity, control is transferred to the high thermostat.

Here, humidity control is accomplished by a variation of the enclosure temperature within fixed limits, and this variation is controlled by the hygrometer, which shifts the control so that if humidity becomes too great, a relay or equivalent device is closed whereby control is given to a high temperature thermostat which acts to turn on heat supply and air exhaust fan. When the relay closes, the control is transferred to the high temperature thermostat and heat supply and air exhaust fan operations are resumed.

With the present device, temperature can be regulated within a very narrow temperature range, by the automatic control of a master valve of the heating system or of a plurality of such valves. When used with steam systems, the boiler is thus put under direct automatic control and supplies heat in correspondence to demands of the thermostat instead of operating on fixed boiler pressure.

The supports for the exhaust fans, and generally of the fan unit, may in a greenhouse be substituted for and occupy the place of the panes of glass, and may be set at definite intervals along one or both sides of the enclosures. They may be set in the ridges if the construction is of the ridge and furrow type. A damper (not shown) is employed, which closes when the fan stops, and opens only when the fan starts. This damper serves to exclude cold air and rain or snow.

An important point is, that by increasing the temperature when the relative humidity rises the humidity will tend to be lower in the approximate ratio of 3% drop in relative humidity for each degree rise of temperature, which drop is increased by the starting of the exhaust fans. The exhaust fans pull in outside air which is colder. By exhausting air with fans, no cold currents are set up and uniform condition can be maintained during air entry.

Although a plural thermostatic control has been illustrated in Figure 1, and finds valuable use in climates where winter temperatures are say only ten or fifteen degrees below the enclosure temperature, yet in climates where the outside temperature is thirty or forty degrees below the enclosure temperature an accurate control can be obtained by using a single thermostatic control to maintain the proper temperature, and by exhausting humid air and replacing it by outside air. The de-humidifying operation can be speeded up by heating the air as it enters.

The function of the hygrostat is to shift electric control for the heat supply from one thermostat to the other, whereby the supply of heat may be automatically varied. The present system is partly based on the principle that by increasing the temperature when relative humidity rises, the humidity will tend to be lowered.

It is conceivable that de-humidification can also be performed by raising the temperature of the enclosure, and an embodiment of the invention contemplating such an arrangement is shown in Figure 2. Inasmuch as the only essential difference here is that the fan is not used, and inasmuch as the valve motor has been previously described, and inasmuch as the operations are substantially the same as previously described, no extended numerical reference is made, and the same numerals have been used to designate corresponding parts. The operation described for Figure 1 applies equally well for Figure 2, the only difference being that contact 61 is eliminated and the fan is eliminated. However, when the heating apparatus 2 is active, air is drawn in at ventilator (or ventilators) 72 and warmed, and under these conditions, a certain amount of air escapes through the ventilator (or ventilators) 71 so that humidity is reduced.

In Figure 3, the operation is substantially the same. It is evident that as soon as the humidity reaches a proper critical value, relay 59 will be closed as well as contact 61, to start the fan. The thermostat in this case will cause the supply of heat to be delivered when it makes at B, and turn off the supply of heat when it makes at W.

The humidity control may be of the type in which the hygroscopic element is a strip of animal membrane. As the humidity decreases, the membrane contracts, and vice versa. The contact which is controlled by the membrane can act either to open or close a valve or to open and close a relay, thus starting the humidifying apparatus. If relative humidity increases the animal membrance expands.

I claim as my invention:

1. In combination a system including an enclosure, means for admitting air thereto, heating means arranged so that entering air is warmed thereby, means for exhausting air from the enclosure including a fan, a valve for controlling heat supply to said heating means, an hygrostat, two thermally-sensitive devices each adapted at a given temperature level to assume control of the system, and means including electrical connections adapted, when relative humidity increases to a certain degree, to transfer the control of the system to that thermostat which is set to assume control at the higher temperature level, and cause said exhaust fan to operate to remove air over-ladened with moisture, and further adapted when humidity has dropped a certain degree to transfer control to that thermostat which is set to assume control at the lower temperature level, and stop the exhaust fan.

2. In combination within an enclosure, an hygrometer, a temperature-responsive device, heat supply means, heat supply regulating means, and electrical connections adapting the hygrometer to control said heat regulating means to supply heat when the temperature-responsive device responds to a predetermined temperature, and ventilating means for the enclosure including an electric fan adapted to withdraw air from the enclosure when heat is supplied.

3. In combination within an enclosure, an hygrometer, a temperature-responsive device, heat supply means, heat supply regulating means, electrical connections adapting the hygrostat to control said heat-regulating means to supply heat when the temperature-responsive device responds to a predetermined temperature, and ventilating means for the enclosure including an electric fan controlled by said hygrometer, and adapted to withdraw air from the enclosure when heat is supplied.

4. In combination with an enclosure, an hygrometer, a temperature-responsive device, heat supply means, heat supply regulating means, and electrical connections adapting the hygrostat to control said heat-regulating means to supply heat when the temperature responsive device responds to a predetermined temperature, and ventilating means for the enclosure including an electric fan adapted to withdraw air from the enclosure when heat is supplied, said enclosure having an air intake ventilator so placed as to cause the air to be heated as it enters.

5. In a device of the class described, an enclosure having therein an hygrostat, a thermal switch adapted to assume command at one temperature, a second thermal switch adapted to assume command at a different temperature, a heater, means for controlling the heater, a fan, and connections by which the thermostats control the heater control means and by which the hygrostat can transfer command from one thermostat to the other conformably to variations in humidity, and by which the fan is operated to exhaust air when the humidity rises to a critical point.

6. In combination, an enclosure, an hygrometer responsive to enclosure humidity, temperature-sensitive means, means adapted to displace humid enclosure air, and means adapting said hygrometer and temperature-sensitive means to cooperate to cause said displacing means to perform a displacing operation when the hygrometer responds to a sufficiently high degree of humidity, and when said temperature-sensitive means responds to a predetermined temperature.

7. In combination with an enclosure, an hygrometer, a temperature-responsive device, heat supply means, heat supply regulating means, and electrical connections adapting the hygrometer to control said heat regulating means to supply heat when the temperature-responsive device responds to a predetermined temperature, and means by which a displacement of humid air of the enclosure is obtained, when heat is supplied.

8. In combination, a system including an enclosure, means for admitting air to the enclosure, heating means arranged to heat entering air, means for displacing humid air, means for controlling heat supply to the heating means, an hygrometer, two thermally sensitive devices, each adapted at a given temperature level to assume control of the system, and means including electrical connections adapted, when relative humidity increases to a certain degree, to transfer the control of the system to one of the thermally-sensitive devices and cause the air displacing means to displace moisture-laden air, and further adapted when the humidity has dropped to a certain degree to transfer control to the other thermally-sensitive means which is set to assume control at the lower temperature level, and to render inoperative said displacing means.

9. A control system of the class described, comprising means for heating an enclosed space, a first thermostat adapted to control said means to maintain said space at a first predetermined temperature, a second thermostat adapted to control said means to maintain said space at a second predetermined temperature different from the first said temperature, and a humidity responsive device for shifting control of said means from one thermostat to the other upon change of humidity in said space.

10. A control system of the class described including heating means, a plurality of temperature responsive devices set to act between fixed maximum and minimum temperatures and means by which they alternately assume command of the heating means, humidity responsive means, and means by which the last mentioned means modifies the effective control action of the temperature responsive devices.

11. A control system of the class described comprising heating means, a plurality of temperature responsive devices and means by which they alternately control the heating means, humidity responsive means, and means by which it shifts the control from one temperature responsive device to the other.

12. In combination, humidity responsive means, heating means, a plurality of temperature responsive means, and means by which each controls the heating means, and means controlled by the humidity responsive means for selectively and directly controlling the effective actions of said temperature responsive means.

GEORGE DUDLEY KINGSLAND.